G. A. HOWE.
Cotton Harvester.
No. 53,147.
Patented March 13, 1866.
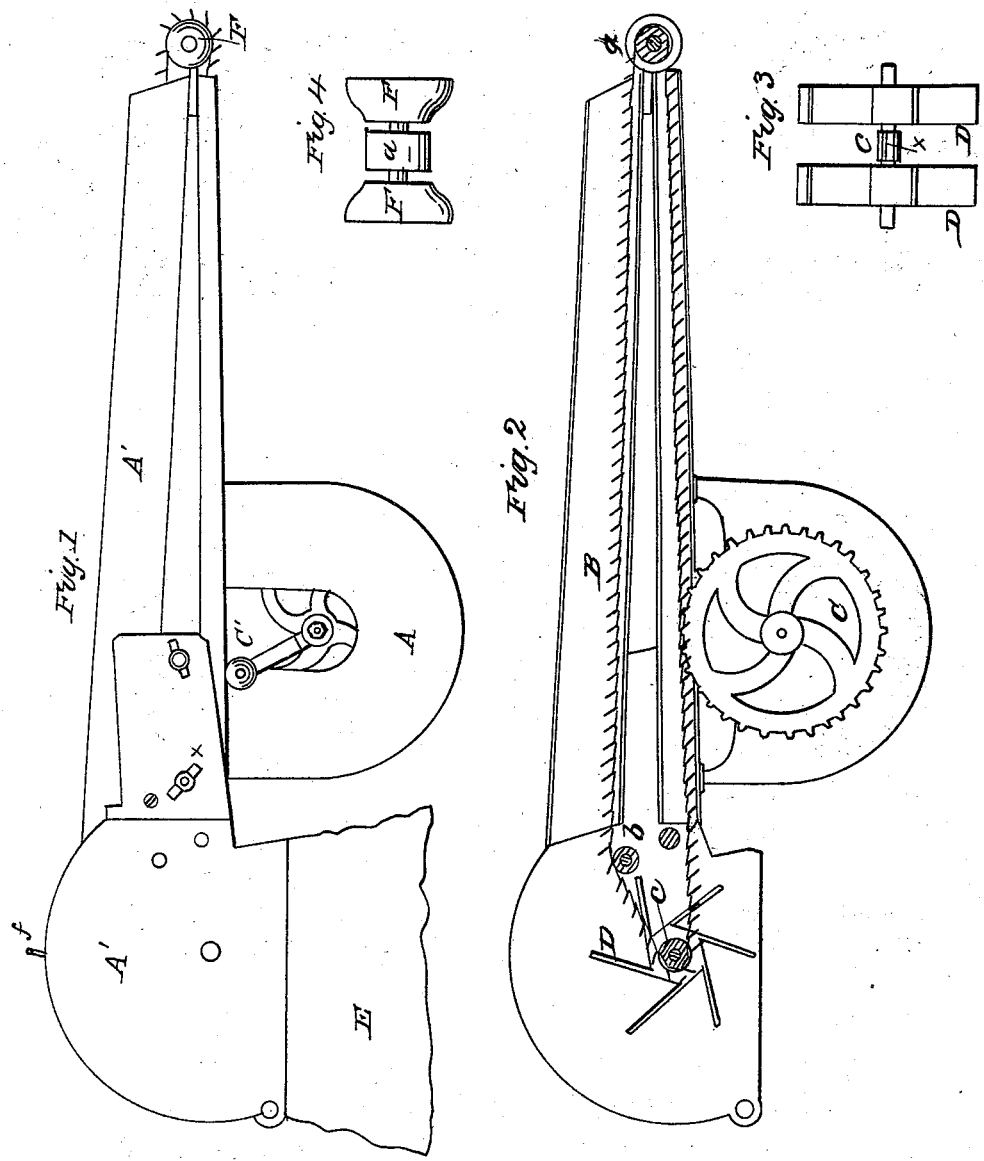

UNITED STATES PATENT OFFICE.

GEORGE A. HOWE, OF BROOKLYN, NEW YORK.

IMPROVEMENT IN COTTON-PICKERS.

Specification forming part of Letters Patent No. 53,147, dated March 13, 1866.

*To all whom it may concern:*

Be it known that I, GEORGE A. HOWE, of Brooklyn, in the county of Kings and State of New York, have invented certain new and useful Improvements in Cotton-Harvesting Machines; and I do declare that the following is a full and exact description thereof, reference being had to the accompanying drawings and the letters of reference marked thereon.

My invention consists in improvements upon a cotton-picking machine for which Letters Patent of the United States were issued to me on the 4th day of December, 1855; and said improvements are applicable to any machine which operates upon the same general principles.

In the accompanying drawings, Figure 1 is a view of the complete machine ready for use in the field. Fig. 2 is longitudinal vertical section of the same. Fig. 3 is a view of the stripper with the roller $c$, which revolves it. Fig. 4 is a view of the roller around which the endless toothed chain passes at the point where the cotton is gathered from the boll, with side guards.

Like letters indicate the same parts in all the figures.

To enable others skilled in the art to make and use my invention, I will proceed to describe its construction and operation.

In the accompanying drawings, A is the external case of the machine, which may be made of tin-plate or any other thin sheet metal, and A' a spout through which the cotton is carried to the stripper.

B is an endless toothed chain, which revolves on rollers $a\ b\ c$.

C is a toothed wheel, which is turned by a hand-crank, C', and the teeth of which mesh into the links of the endless chain B and revolve it.

D is the stripper, which clears the cotton from the endless toothed chain B and throws it down into the bag or other receptacle for it.

E is a bag attached to the machine, for receiving the cotton as it is detached from the endless toothed chain by the stripper.

F F are two circular convexo-concave guards, placed one at each end of the roller $a$, round which the endless toothed chain passes at the point where it seizes the cotton and detaches it from the boll. These guards are placed with their convex sides inward, the central parts of their inner surfaces being made flat and smooth to about the diameter of the roller $a$, which revolves between them, carrying the toothed chain. Their office is to shield the cotton as it is detached from the boll by the toothed chain and carried into the case of the machine from stems, husks, dry leaves, and other foreign substances, and also to protect the chain from injury by stems, sticks, and the like.

The stripper consists of two sets of fans projecting tangentially from two hubs, one at each end of the roller $c$ and on the same axis, the endless toothed chain revolving between said two sets of fans and causing them to rotate by acting on the roller $c$, which has a series of grooves, as shown at $x$, Fig. 3, to receive the cross-bars of the chain and prevent its slipping.

The machine is carried under the left arm of the operator by means of a strap passing through the staple $f$ and over the right shoulder. Being well drawn up under the left arm, the crank C' is turned by the right hand, causing the wheel C and the endless toothed chain B to rotate briskly. The extreme end of the machine is then presented to the boll of cotton, when the fibers are seized by the teeth of the endless chain as it passes around the roller $a$ and between the guards F F. The cotton is detached from the boll and carried by the endless toothed chain into and up the spout A' till it reaches the strippers, by which it is detached from the chain and falls into the bag or other receptacle, E.

What I claim as my improvements and invention is—

1. The wheel C, acting directly upon the endless chain to rotate it, substantially as described.

2. Rotating the stripper D by means of the endless chain passing around and acting directly upon its axis, substantially as described.

3. The guards F F, in combination with the endless toothed chain, constructed, arranged, and operating substantially as and for the purpose described.

GEORGE A. HOWE.

Witnesses:
JOHN COON,
J. J. COOMBS.